United States Patent
Duranton et al.

(10) Patent No.: US 6,349,378 B1
(45) Date of Patent: Feb. 19, 2002

(54) DATA PROCESSING USING VARIOUS DATA PROCESSORS

(75) Inventors: Marc Duranton, Boissy Saint Leger; Loic Geslin, Paris; Valerie Vier, Vincennes; Bernard Bru, Limeil Brevannes, all of (FR)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/282,325

(22) Filed: Mar. 31, 1999

(51) Int. Cl.[7] .......................... G06F 9/46; G06F 15/177
(52) U.S. Cl. ................................. 712/28; 712/15
(58) Field of Search ................ 712/15, 28, 22, 712/21, 20, 13, 231; 713/100

(56) References Cited

U.S. PATENT DOCUMENTS

| | | | | |
|---|---|---|---|---|
| 5,127,092 A | * | 6/1992 | Gupta | 712/234 |
| 5,280,620 A | | 1/1994 | Sluijter et al. | 395/800 |
| 5,357,632 A | * | 10/1994 | Pian | 709/105 |
| 5,361,367 A | * | 11/1994 | Fijany | 712/15 |
| 5,721,921 A | * | 2/1998 | Kesslev | 709/102 |
| 5,765,009 A | | 6/1998 | Ishizaka | 395/800 |
| 5,768,538 A | * | 6/1998 | Badovinatz | 709/248 |
| 5,928,351 A | * | 7/1999 | Horie | 712/11 |
| 5,956,518 A | * | 9/1999 | DeHon | 712/15 |
| 6,085,303 A | * | 7/2000 | Thorson | 712/16 |

FOREIGN PATENT DOCUMENTS

EP 0373714 A1 6/1990

* cited by examiner

Primary Examiner—Eric Coleman
(74) Attorney, Agent, or Firm—Laurie E. Gathman (57) ABSTRACT

A data processing arrangement comprises various data processors (P) and a memory arrangement (MA) for supplying input data (Di) to the data processors (P) and for storing output data (Do) from the data processors (P). The following steps are alternately carried out: a configuring step (CS) and a processing step (PS). In a configuration step (CS), the data processing arrangement is configured such that each data processor (P) will process a block (B) of data contained in the memory arrangement (MA) and then stop processing data. In a processing step (PS), the blocks (B) of data are processed in the respective data processors (P). A subsequent configuring step (CS) is carried out only when each data processor (P) has processed its block (B) of data (∀P: B=PROC>CS). Such a data processing arrangement allows great versatility because different data processing chains can be realized without this requiring relatively complicated software.

10 Claims, 6 Drawing Sheets

| | PS[i] | PS[i+1] | PS[i+2] | |
|---|---|---|---|---|
| B[j] | HGHWY → IF → MB1 | MB1 → P1 → MB2 | MB2 → P2 → MB3 | --- |
| B[j+1] | | HGHWY → IF → MB1 | MB1 → P1 → MB2 | --- |

FIG. 10

DATA PROCESSING USING VARIOUS DATA PROCESSORS

FIELD OF THE INVENTION

The invention relates to a data processing arrangement comprising various data processors and a memory arrangement for supplying input data to the data processors and for storing output data from the data processors. Such a data processing arrangement may be used, for example, in multimedia products.

BACKGROUND ART

EP-A-0,373,714 describes a data processor comprising a plurality of parallel-operating processor elements. A coupling network couples outputs of the data processor its inputs. The coupling network comprises the following components: one or more cross-bar switches and one or more arrays of silos. A series connection is formed in which these components are alternately arranged in a succession comprising at least three elements.

SUMMARY OF THE INVENTION

It is an object of the invention to allow greater versatility of a data processing arrangement as defined in the opening paragraph.

The invention takes the following aspects into consideration. Let it be assumed that the data processing arrangement processes data in the following manner. A first data processor processes the data so as to obtain once processed data which is written into the memory arrangement. Subsequently, a second data processor reads the once processed data, processes it so as to obtain twice processed data which is written into the memory arrangement, and so on. That is, the data processors form a data processing chain. The memory arrangement provides buffer storage capacity between two successive data processors in the data processing chain.

In a data processing as described hereinbefore, there is a potential synchronization problem. A data processor may request data from the memory arrangement, whereas this data has not yet been written into the memory arrangement by a preceding data processor in the data processing chain. This synchronization problem is due to processing delays of the various data processors, or due to different processing speeds, or both.

In the background art, the synchronization problem appears to be solved in the following manner. Each data processor is programmed such that it takes into account the processing delays and the processing speeds of preceding data processors. That is, the programming of a data processor includes a correct timing of the data processing in the data processor with respect to the data processing in the preceding data processors.

The solution to the synchronization problem as described hereinbefore has the following drawback. Let it be assumed that a different data processing chain is desired. This implies that the order in which the data processors process data needs to be changed, or that one or more data processor need to carry out a different type of processing, or both. In that case, the processing delays of one or more data processors will change, or the processing speeds of one or more data processors will change, or both. Consequently, it will be necessary to re-program nearly each data processor in order to avoid a synchronization problem. This reprogramming will generally be quite complex because a data processor has to take into account the processing delays and the processing speeds of various other data processors. This is true even if one data processor only is made to carry out a different data processing. Thus, the background-art data processing arrangement is ill suited for realizing different data processing chains because this requires relatively complicated software.

In accordance with the invention, a data processing arrangement as defined in the opening paragraph, is controlled in the following manner. A configuration step and a processing step are alternately carried out. In the configuration step, the data processing arrangement is configured such that each data processor will process a block of data contained in the memory arrangement and then stop processing data. In the processing step, the blocks of data are processed in the respective data processors. A subsequent configuring step is carried out only when each data processor has processed its block of data.

Accordingly, in the invention, it can be prevented that, while the data processors process data, a data processor requests data from the memory arrangement which an other data processor has not yet written into the memory arrangement. Thus, the synchronization problem is solved. What is more, while the data processors process data, a data processor need not have knowledge of the processing delays and the processing speeds of the other data processors. Consequently, if the order in which the data processors process data is changed, it will not be necessary to re-program nearly each data processor for reasons of synchronization. Furthermore, if a data processor is re-programmed to carry out a different type of processing, it will not be necessary to re-program various others data processors. Consequently, a data processing arrangement in accordance with the invention can realize different data processing chains without this requiring relatively complicated software. Thus, the invention allows greater versatility.

The invention and additional features, which may be optionally used to implement the invention to advantage, are apparent from and elucidated with reference to the drawings described hereinafter.

DETAILED DESCRIPTION OF THE DRAWINGS

First, some remarks will be made on the use of reference signs. Similar entities are denoted by an identical letter code throughout the drawings. Various similar entities may be shown in a single drawing. In that case, a numeral is added to the letter code so as to distinguish similar entities from each other. The numeral will be between parentheses if the number of similar entities is a running parameter. In the description and the claims, any numeral in a reference sign may be omitted if this is appropriate.

Figure 1:
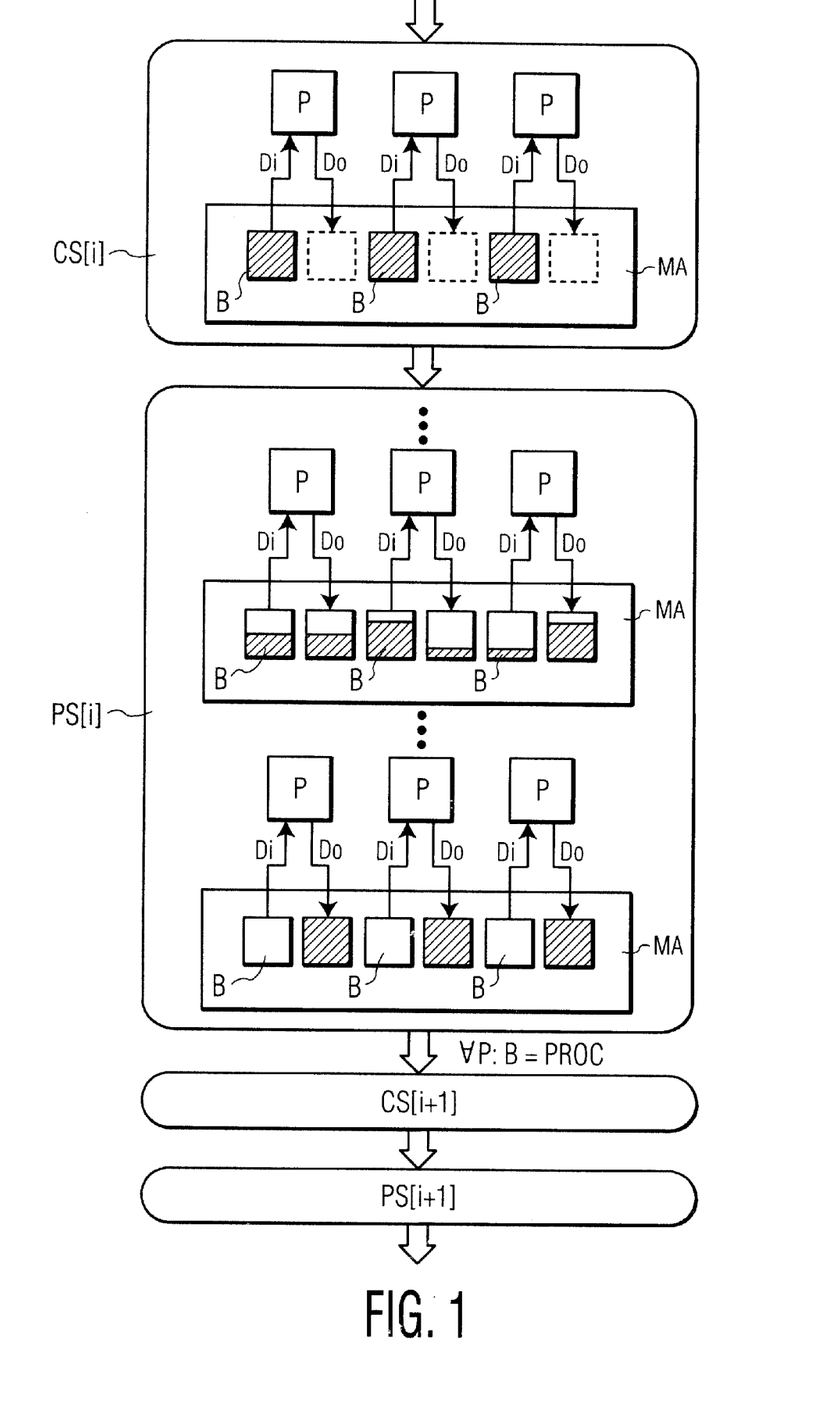
FIG. 1 is a conceptual diagram illustrating basic features of the invention as claimed in claim 1.

FIG. 1 illustrate basic features of the invention. A data processing arrangement comprises various data processors P and a memory arrangement MA for supplying input data Di to the data processors P and for storing output data Do from the data processors P. The following steps are alternately carried out: a configuring step CS and a processing step PS. In a configuration step CS, the data processing arrangement is configured such that each data processor P will process a block B of data contained in the memory arrangement MA and then stop processing data. In a processing step PS, the blocks B of data are processed in the respective data processors P. A subsequent configuring step CS is carried out only when each data processor P has processed its block B of data ($\forall$P: B=PROC>CS).

To advantageously implement the features illustrated in FIG. 1, the following aspects have been taken into consideration. There are various manners in which it can be ensured that a configuration step CS is carried out only when each data processor P has processed its data. A basic manner is as follows. A configuration step is carried out a fixed number of clock cycles after the previous configuration step. That is, there is a fixed time slot for the processing step in between these configuration steps. The data processing arrangement can be configured such that each data processor P will certainly be able to carry out its data processing within the fixed time slot.

For reasons of reliability, the fixed time slot as described above should preferably include a certain margin. This to ensure that the last data processor has finished its processing before a new configuration step is carried out. It may happen that this margin turns out to be relatively large for some processing steps. That is, it may happen that each data processor has finished its processing well before the configuration step is carried out. In that case, the data processing arrangement will, in effect, be idle during a certain number of clock cycles. Clock cycles are, as it were, wasted. Thus, the method described hereinbefore has a drawback in terms of processing speed.

Figure 2:
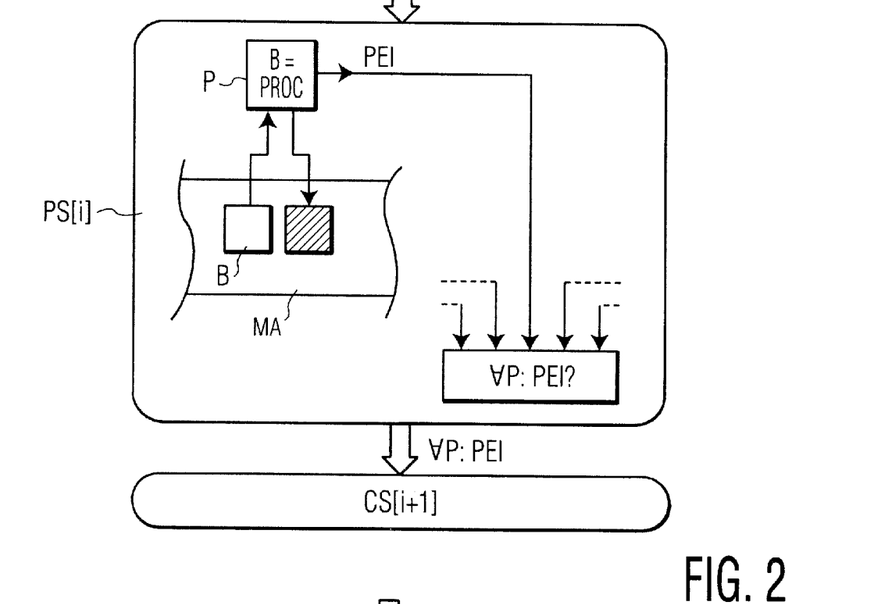
FIGS. 2 and 3 are conceptual diagrams illustrating additional features as claimed in claims 2 and 3, respectively.

FIG. 2 illustrates the following features which may be optionally added to the features which have been discussed with reference to FIG. 1. In the processing step PS, a data processor P provides a processing-end indication PEI when the data processor P has processed its block of data (B=PROC). It is monitored whether each data processor P has provided a processing-end indication PEI ($\forall$P:PEI?). If so ($\forall$P:PEI), a new configuring step CS is carried out.

The features illustrated in FIG. 2 provides the following advantage. A configuration step can be carried out shortly after each data processor P has finished its data processing. For example, the configuration step may be carried out at the first clock cycle following the instant at which each data processor has provided a processing-end indication PEI. There is no need to build in a margin as in the method described before the description of FIG. 2. Thus, the FIG. 2 features allow that a greater percentage of clock cycles is effectively used for data processing. Consequently, the features illustrated in FIG. 2 contribute to a satisfactory processing speed.

To advantageously implement the features illustrated in FIG. 1, the following aspects have also been taken into consideration. In practice, the data processing arrangement will comprise an assembly of controllable circuits which includes the data processors. A controllable circuit will typically comprise a control register whose content defines the operation of the controllable circuit. In a configuration step, it is possible to serially write configuration data into various control registers so as to obtain the desired configuration for the subsequent processing step. However, this may be relatively time consuming if there are relatively many controllable circuits and thus potentially many control registers to be written. In that case, the configuration step will be relatively lengthy. As a result, the percentage of time during which the data processing arrangement effectively processes data, will be relatively low because the data processing arrangement does not process data during a configuration step. Thus, the data processing arrangement will have a relatively low processing speed.

Figure 3:
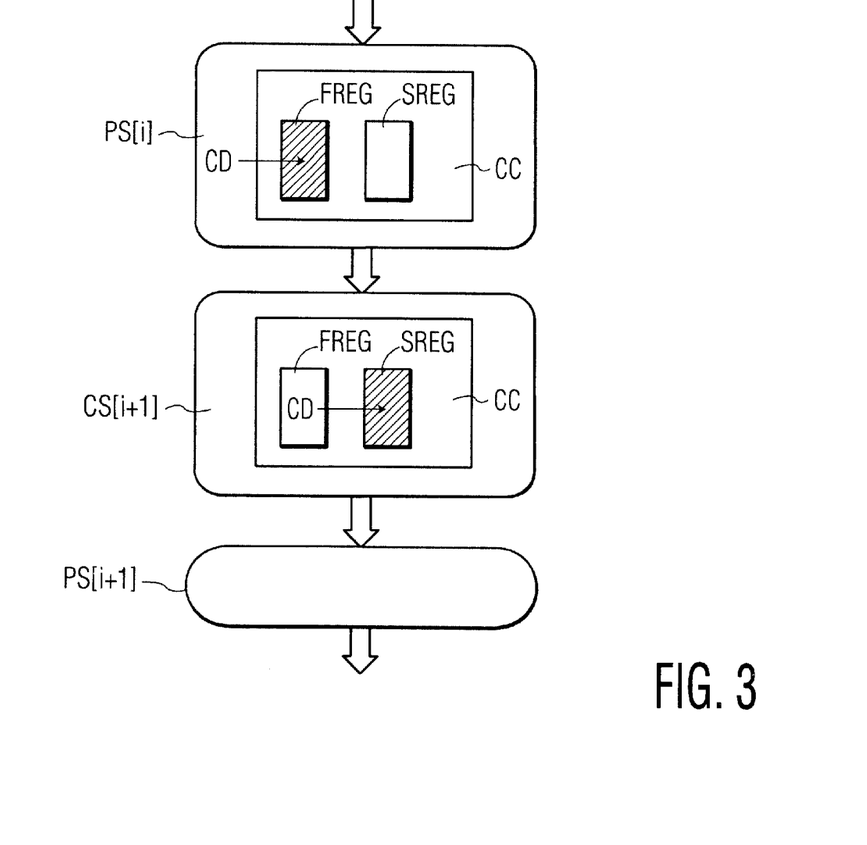

FIG. 3 illustrates the following features which may be optionally added to the features which have been discussed with reference to FIG. 1. In a processing step PS, configuration data CD is written into a front register FREG associated to a controllable circuit CC. In a configuring step CS, the configuration data CD is transferred from the front register FREG to a shadow register SREG, the content of the shadow registers SREG defining the operation of the controllable circuit CC.

The features illustrated in FIG. 3 provide the following advantage. Configuration data CD in a front register FREG does not immediately influence the operation of the controllable circuit CC to which the front register FREG is associated. Thus, during a processing step PS[i], configuration data CD for the next processing step PS[i+1] can be send in advance to the front registers FREG of various controllable circuits. This sending of configuration data CD can be done serially via a bus system, which is advantageous in terms of circuit complexity. The data processing arrangement can be configured for the next processing step PS[i+1] by transferring configuration data CD contained in front registers FREG to shadow registers SREG. These transfers can be done in parallel, for example, within one clock cycle. Thus, the features illustrated in FIG. 3 allows a configuration step which can be carried out relatively fast such that a relatively great percentage of time can effectively be used for data processing. Consequently, the features illustrated in FIG. 3 contribute to a satisfactory processing speed.

Figure 4:
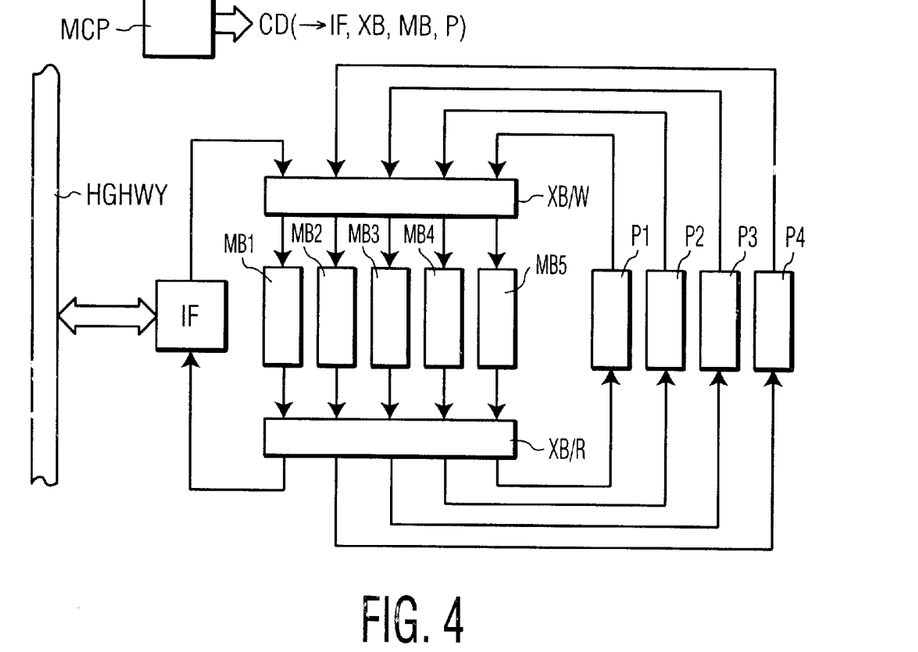
FIG. 4 is a block diagram illustrating an example of a data processing arrangement in accordance with the invention.

FIG. 4 illustrates an example of a data processing arrangement which recaptures the features illustrated in FIGS. 1, 2 and 3. The data processing arrangement receives data to be processed via a bi-directional bus HGHWY and outputs processed data via the same bus. The data processing arrangement comprises a master control processor MCP and an assembly of functional units: a bus interface IF, memory blocks MB, a write crossbar XB/W, a read crossbar XB/R and data processors P. The read crossbar XB/W and the write crossbar XB/R define connections between the bus interface IF and the data processors P on the one hand, and the memory block MB on the other hand.

Figure 5:
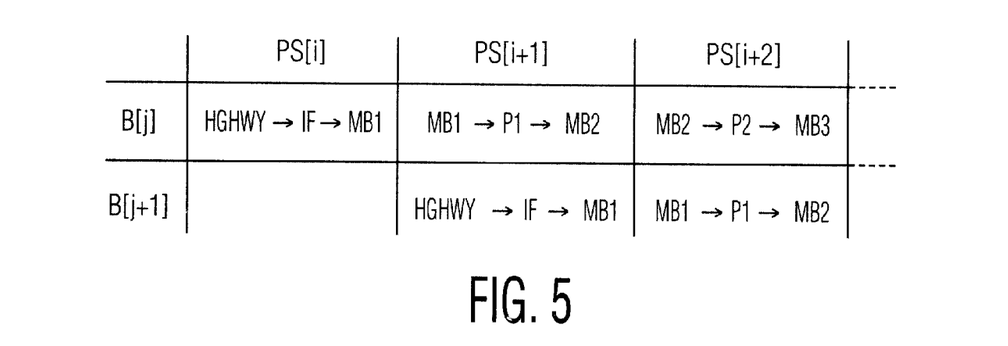
FIG. 5 is a table illustrating an example of a data flow in the data processing arrangement illustrated in FIG. 3.

FIG. 5 illustrates an example of a manner in which the data processing arrangement illustrated in FIG. 4 may operate. In FIG. 5, each column represents a processing steps PS and each rows represents a block of data B to be processed. In processing step PS[i], the bus interface IF fetches a block of data B[j] to be processed from the bi-directional bus HGHWY and writes this data into one of the memory blocks MB, for example memory block MB1 (PS[i]/B[j]: HGHWY→IF→MB1). In processing step PS[i+1], the block of data is read by one of the data processors P, for example data processor P1, and processed by this data processor. Accordingly, a block of once processed data is obtained which is written into one of the memory blocks MB, for example memory block MB2 (PS[i+1]/B[j]: MB1→P1→MB2). In processing step PS[i+2], the once processed data is subsequently read by another data processor P, for example data processor P2, and processed by this data processor. Accordingly, a block of twice processed data is obtained which is written into one of the memory blocks, for example memory block MB3 (PS[i+2]/B[j]: MB2→P2→MB3). This processing may continue in the same fashion until the block of data B[j] has been N times processed, N being an integer. The bus interface IF may then place the N times processed block of data on the bi-directional bus HGHWY.

In processing step PS[i+1], the bus-interface IF fetches a new block of data B[j+1] from the bi-directional bus HGHWY and writes this data into one of the memory blocks MB, for example memory block MB1 (PS[i+1]/B[j+1]: HGHWY→IF→MB1). In processing step PS[i+2], the block of data is read by one of the data processors P, for example data processor P1, and processed by this data processor. Accordingly, a block of once processed data is obtained which is written into one of the memory blocks MB, for example memory block MB1 (PS[i+2]/B[j+2]: MB1→P1→MB2). Thus, the same data processing chain which is applied to data block B[j] may also be applied to data block B[j+1]. However, the data processing arrangement illustrated in FIG. 1 also allows to apply a different data processing chain to data block B[j+1].

The master control processor MCP determines which data processing chain is applied to a certain block of data being fetched from the bidirectional bus HGHWY. The master control processor MCP further determines the amount of data which a processor P should process during a processing step PS. To that end, the master control processor MCP supplies configuration data CD to the various functional units. For example, the configuration data CD which the master control processor MCP supplies to the read cross bar XB/R defines connections between the outputs of the memory blocks MB, on the one hand, and the processors P and the bus interface, on the other hand.

The configuration data CD which the master control processor MCP supplies to a processor P, defines the type of data processing to be carried out by the processor P. For example, let it be assumed that the processor P is a convolution filter. In that case, the configuration data CD defines the filter characteristics, that is, it defines the size of the filter kernel and the filter coefficients. The configuration data CD further defines the number of data elements, for example pixels, which the processor P has to process during a processing step PS. This will be explained in greater detail hereinafter.

Figure 6:
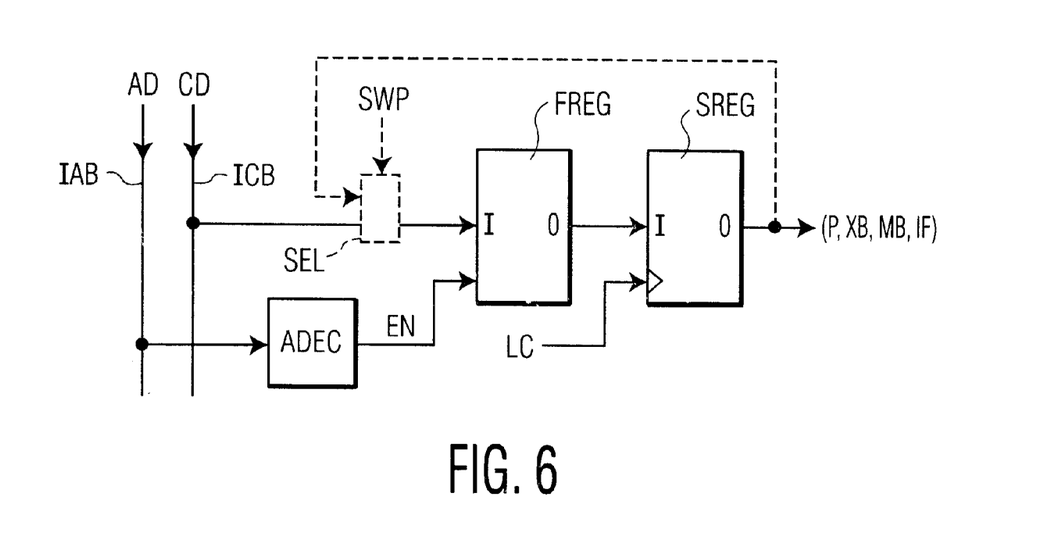
FIG. 6 is a block diagram illustrating an example of a control register in the data processing arrangement illustrated in FIG. 4.

FIG. 6 illustrates a control register in which the master control processor MCP may write configuration data CD. Each functional unit has one or more of such control registers. The control registers are coupled to the master control processor MCP via an internal control-data bus ICB and an internal address bus IAB. The control register comprises an address decoder ADEC, a front register FREG and a shadow register SREG. The control register may optionally comprise a selector SEL which is shown in broken lines. The front register FREG has an input I which is coupled to the internal control-data bus ICB, and an output O which is coupled to an input of the shadow register SREG. An output O of the shadow register SREG is coupled to one or more controllable elements in the functional unit to which the control register belongs, Thus, the content of the shadow register SREG determines the operation of the functional unit.

The master control processor MCP writes configuration data CD into a control register in the following manner. The master control processor MCP places configuration data CD for the control register on the internal control-data bus ICB. It further places address data AD on the internal address bus IAB. The address decoder ADEC of the control register determines on the basis of the address data AD, whether the configuration data CD is intended for the control register. If so, the address decoder ADEC supplies an enable signal EN to the front register FREG. In response, the front register FREG loads the configuration data CD present on the internal control-data bus ICB. The configuration data CD is further transferred to the shadow register SREG by means of a load configuration command LC. If the load configuration command LC is supplied to the shadow register SREG, this register takes over the configuration data CD previously stored in the front register FREG.

It should be noted that the selector SEL, shown in broken lines, allows the content of the shadow register SREG to be transferred back to the front-register FREG. That is, if a swap command SWP is supplied to the selector SEL, the front register FREG takes over the content of the shadow register SREG and vice versa. This feature allows the functional unit to carry out two different types of operation in alternation without this requiring a transfer of configuration data CD via the internal control-data bus ICB with each alternation.

Figure 7:
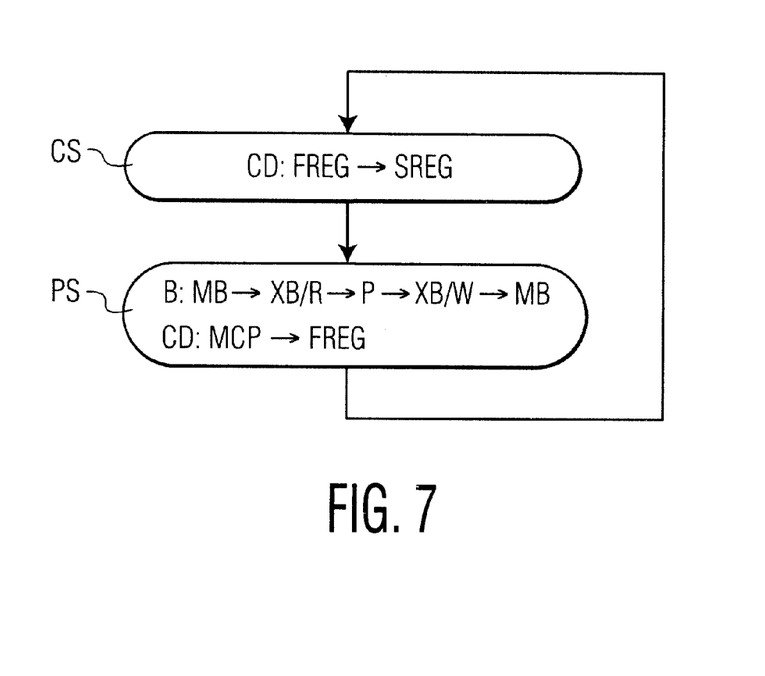
FIG. 7 is a flow chart diagram illustrating a method in accordance with which the data processing arrangement illustrated in FIG. 4 may operate.

FIG. 7 illustrates a method in accordance with which the data processing arrangement illustrated in FIG. 4 may operate. There are two steps which are alternately carried out: a configuration step CS and a processing step PS. Data which has been fetched from the bi-directional bus HGHWY is processed only during a processing step PS, not during a configuration step CS. The content of the shadow registers SREG belonging to the various functional units, can be modified only during a configuration step CS, not a processing step PS.

In a configuration step CS, the master control processor MCP provides a load configuration command LC to the control registers CREG of the functional units. As explained with reference to FIG. 6, the configuration data CD contained in the front register FREG will be transferred to the shadow register SREG (CD: FREG→SREG). As a result, each functional unit will be configured in accordance with the configuration data CD which the master control processor has previously transferred to the control register CREG of the functional unit.

In a processing step PS, the functional units process data which has previously been fetched from bi-directional bus HGHWY. Typically, a block B of data contained in a memory block MB is transferred via the read cross bar XB/R to a data processor P. The data processor P processes the data and the data thus processed is transferred via the write crossbar XB/W to a certain portion of a memory block MB (B: MB→XB/R→P→XB/W→MB). Meanwhile, the master control processor MCP may write configuration data CD into the front registers FREG of one or more various functional units (CD: MCP→FREG). That is, during a processing step PS, the master control processor MCP can, as it were, prepare a new configuration for the next processing step PS.

Figure 8:
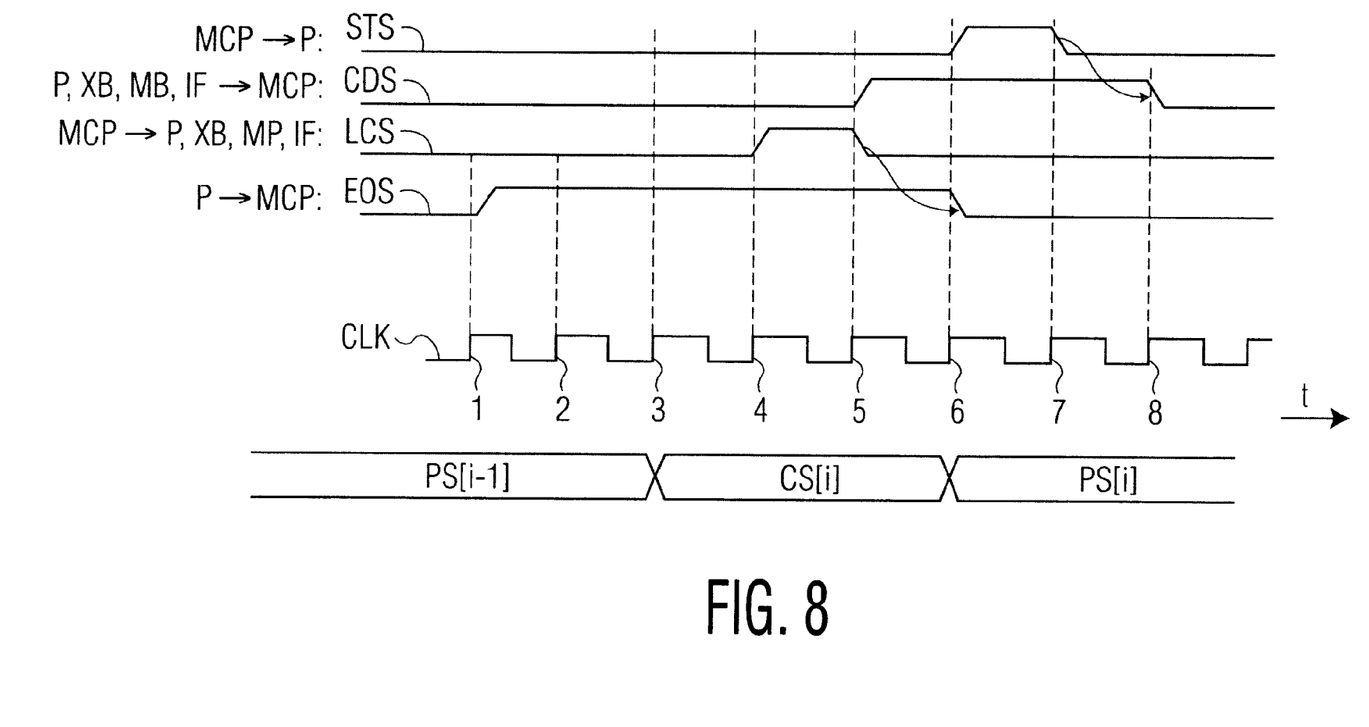
FIG. 8 is a time diagram illustrating signals associated with the method illustrated in FIG. 7.

FIG. 8 illustrates how a processing step PS[i−1] is succeeded by a configuration step CS[i] and a new processing step PS[i]. In FIG. 8, four binary signals are represented: a start signal STS, a configuration-done signal CDS, a load-configuration signal LCS and an end-of-operation signal EOS. The start signal STS originates from the master control processors MCP and is supplied to the data processors P (MCP→P: STS). The configuration done signal CDS originates from a functional unit, for example a processor P. Each functional unit having a control register generates a configuration-done signal CDS and supplies this signal to the master control processor MCP (P,XB,MB,IF→MCP: CDS). The load-configuration signal LCS originates from the master control processor MCP and is supplied to the various functional units (MCP→P,XB,MP,IF: LCS). The end-of-operation signal EOS originates from a data processor P. Each data processor P generates an end-of-operation signal EOS and supplies this signal to the master control processor (P→MCP: EOS). In FIG. 8, a clock signal CLK with rising edges 1–8 is also represented. With each rising edge a clock-controlled element in the data processing arrangement may change its state.

Let it be assumed that the signals illustrated in FIG. 8 are exchanged between the master control processor MCP and data processor P1. At rising edge 1 of the clock signal CLK, the data processor P1 has finished its task. In order to signal this to the master control processor MCP, data processor P1 makes that its end-of-operation signal EOS changes from '0' to '1'. A data processor P may know that it has finished its task, for example, by means of a counter which is loaded in a configuration step and which counts down one unit with each processed data element in a processing step. When the counter has reached zero, the data processor P has processed the required number of data elements and, consequently, it stops processing and makes that its end-of-operation signal EOS changes from '0' to '1'.

It is assumed that all end-of-operation signals EOS are '1' at rising edge 3 of the clock signal CLK. The master control processor MCP deduces from this, as it were, that all data processors P have finished their tasks. In response, the master control processor MCP makes that the load configuration signal LCS changes from '0' to '1' at rising edge 4 of the clock signal CLK. In response to the load configuration signal LCS being '1', the configuration data CD in the front register FREG is transferred to the shadow register SREG. This has been explained hereinbefore with reference to FIGS. 5 and 6.

Data processor P1 makes that its configuration-done signal CDS changes from '0' to '1' at rising edge 5. By doing so, data processor P1 confirms to the master control processor MCP that the configuration data CD has been transferred and thus that it is ready to carry out its new task. It is assumed that all configuration-done signals CDS changed from '0' to '1' at rising edge 5.

The master control processor MCP makes that load configuration signal LCS changes from '1' back to '0' at rising edge 5. In response to the load configuration signal LCS being '0', each data processor P makes that its end-of-operation signal EOS changes from '1' to back to '0' at rising edge 6. That is, a reset of the load configuration signal LCS triggers a reset of the end-of operation signal EOS with the next rising edge of the clock signal CLK.

It is assumed that all configuration-done signals CDS are '1' at rising edge 6. The master control processor MCP deduces from this, as it were, that all functional units are ready to carry out a new processing step. Accordingly, the master control processor MCP makes the start signal STS change from '0' to '1' at rising edge 6. In other words, the master control processor MCP gives the start signal for a new processing step at rising edge 6. In response to the start signal STS being '1', the functional units will start to carry out the tasks they have been assigned to do by means of the configuration data CD.

The master control processor MCP makes that the start signal STS changes from '1' back to '0' at rising edge 7. In response to the start signal being '0', each functional unit make that its configuration-done signal CDS changes from '1' back to '0' at rising edge 8. That is, a reset of the start signal STS triggers a reset of the configuration-done signal CDS with the next rising edge of the clock signal CLK.

Figure 9:
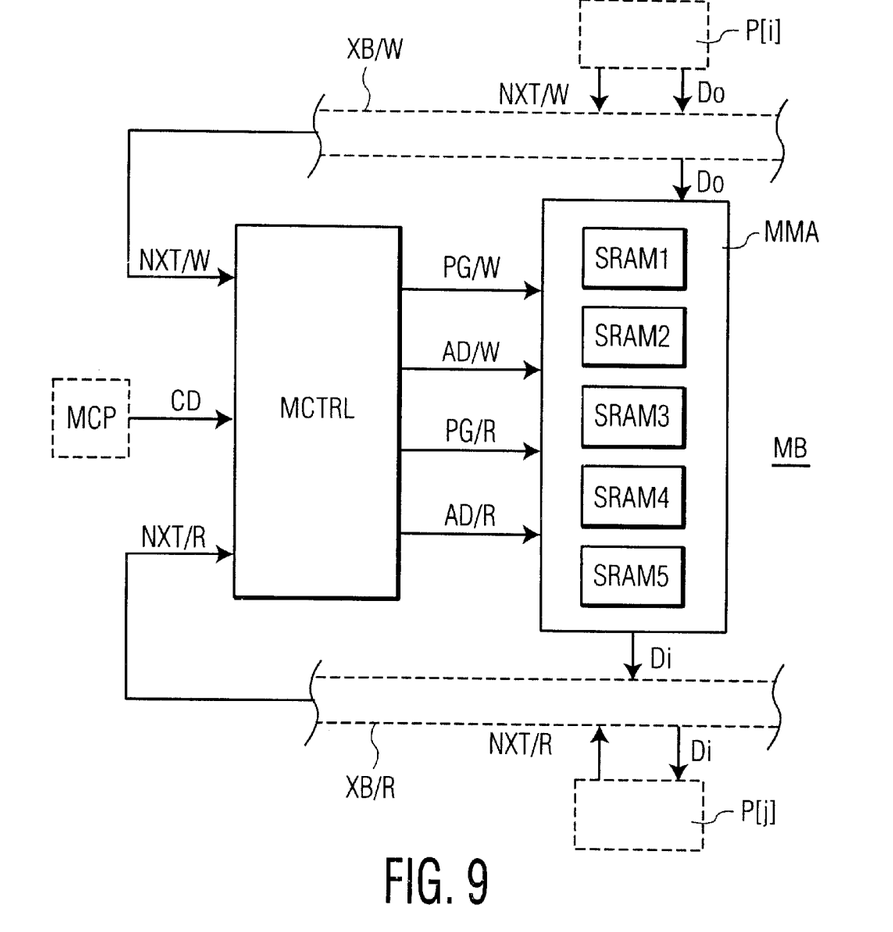
FIG. 9 is a block diagram illustrating an example of a memory block in the data processing arrangement illustrated in FIG. 4.

FIG. 9 illustrates a memory block MB of the data processing arrangement illustrated in FIG. 4. The memory block MB comprises a memory controller MCTRL and a multi-memory arrangement MMA composed of five static random-access memories SRAM1–SRAM5. The multi-memory arrangement MMA has an input port for receiving output data Do from a data processor P[i] via the write crossbar XB/W. The multi-memory arrangement further has an output port for supplying input data Di to a data processor P[j] via the read crossbar XB/R.

The memory block MB basically operates as follows. The memory controller MCTRL instructs the multi-memory arrangement MMA in which SRAM the output data Do has to be written and under which address. It does so by means of a write-page selection signal PG/W and a write address AD/W. The memory controller MCRTL further instructs the multi-memory arrangement MMA from which SRAM input data Di has to be read and under which address. It does so by means of a read-page selection signal PG/R and a read address AD/R. A static SRAM memory can either be written or read at a given instant. Thus writing and reading can not be carried out simultaneously in a static SRAM. The memory controller MCTRL ensures that the SRAM which is selected for writing is not the same as the SRAM which is selected for reading.

During a configuration step, the master control processor MCP supplies configuration data CD to the memory controller MCTRL. The configuration data CD for the memory controller MCTRL can be seen as a set of initialization commands allowing it to autonomously generate the signals PG/W, AD/W, PG/R and AD/R during the processing step which follows. Accordingly, the configuration data CD for the memory controller MCTRL indicates where a reading should start, which SRAM and which address, and how the reading should continue. The configuration data CD further indicates where a writing should start, which SRAM which address, and how the writing should continue.

During a processing step, data processor P[i] supplies next-write commands NXT/W to the memory controller MCTRL. A next-write command NXT/W indicates that data processor P[i] is ready to write a data element into the multi-memory arrangement MMA. The data processor P[j] supplies next read commands NXT/R to the memory controller MCTRL. A next-read command NXT/W indicates that the data processor P[j] is ready to read a data element from the multi-memory arrangement MMA. The memory controller MCTRL increments the write address AD/W and the read address ADIR in response to the next-write command NXT/W and the next-read command NXT/R, respectively. To that end, the memory controller MCTRL may comprise two loadable counters, one for the write address AD/W and one for the read address AD/R, the counters receiving the next-write command NXT/W and the next-read command NXT/R as increment-instructions, respectively.

Figure 10:
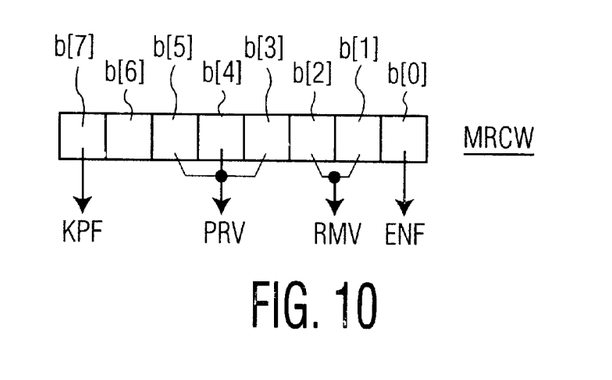
FIG. 10 is a binary-word diagram illustrating a memory-read control word for the memory block illustrated in FIG. 9.

FIG. 10 illustrates a memory-read control word MRCW which may form part of the configuration data CD for the memory block MB illustrated in FIG. 9. It is assumed that the memory controller MCTRL comprises a readaddress counter. The memory-read control word MRCW comprises 8 bits: b[7]–b[0]. The function of these bits will now be explained.

Bit b[7] is a read keep-page flag KPF. When this flag is set to '0' the read-page selection PG/R is automatically incremented when the read-address counter overflows. When read-address counter overflows while the read-page selection PG/R has the maximum value, the read-page selection PG/R is set to its minimum value. This can be regarded as a wrap around. When the read keep-page flag KPF is set to 1, the read-page selection PG/R is not changed during a processing step.

Bit b[6] has no special function.

Bits b[5]–b[3] constitute a 3-bit page-read value PRV. The page-read value PRV indicates the starting value for the read-page selection PG/R and thus indicates from which SRAM data the reading of data should start.

Bits b[2] and b[1] constitute a read-mode value RMV. The read-mode value RMV determines which read mode is to be applied. There are four read modes. In a first read mode, the content of the read-address counter is reset in response to a load configuration command LC. In a second read mode, the reading starts at an address which the master control processor MCP has supplied to the memory controller MCTRL. In a third read mode, the reading starts at an address currently contained in the read-address counter. The read-page selection PG/R is maintained at its current value. That is, the page-read value PRV is ignored. In a fourth read mode, the reading start at an address currently contained in the read-address counter but the read-page selection is set in accordance with the page-read value PRV.

Bit b[0] is a read-enable flag ENF. When this flag is set to '0', reading is allowed. When the read-enable flag ENF flag is set to '1', the 8-bit counter is not incremented even if the memory controller MCTRL receives a next-read command NXT/R. Furthermore, the other bits of the memory-read control word MRCW, bits b[7]–b[1], are ignored.

It goes without saying that the configuration data CD for the memory block MB illustrated in FIG. 9, may comprise a memory-write control word similar to the memory-read control word MRCW illustrated in FIG. 10.

In summary, the processing arrangement illustrated in FIG. 4 operates as follows. In a configuration step, the master control processor MCP configures each data processor P to carry out a certain type of processing. For example, in a video processing application a data processor P may be a horizontal filter or a vertical filter whose characteristics, such as number of filter taps and filter coefficients, are defined by the configuration data CD. The master control processor MCP further configures each data processor P to process a certain number of data elements, for example, a certain number of pixels. Accordingly, the master control processor MCP configures the data processor P to provide the necessary number of next-read and next-write commands NXT/R, NXT/W.

The master control processor MCP further configures the write crossbar XB/W and the read crossbar XB/R. Accordingly, for each data processor P, it is defined from which memory block MB the data processor P will read input data Di and in which memory block MB the data processor P will write output data Do. The master control processor MCP further configures each memory block MB.

Accordingly, it defines for a data processor P which will read input data Di from the memory block MB, the SRAM and the address at which the reading will start. That is, the master control processor MCP defines, as it were, which portion of data contained in the memory block MB is to be processed. The master control processor MCP further defines for the data processor P which will write output data Do into the memory block MB, the SRAM and the address at which the writing will start. That is, the master control processor MCP defines, as it were, in which portion of the memory block MB processed data is to be written.

Once the master control processor MCP has configured the functional elements as described hereinbefore, it provides a start command which marks the beginning of a processing step. In the processing step, the functional elements operate autonomously. Their configuration as defined in the configuration step, is maintained. The master control processor MCP waits, as it were, until each data processor P has processed the amount of data it has been instructed to process. If each data processor P has finished its task, which marks the end of the processing step, the master control processor MCP may carry out a new configuration step.

Thus, the master control processor MCP can be seen as an orchestrator who assigns tasks to the various functional units, who lets the functional units carry out their tasks, and who waits until the last one has finished its task before assigning any new task. The master control processor MCP keeps track, as it were, of a block of data which has been fetched from the bi-directional bus HGHWY. That is, with each configuration step, the master control processor MCP knows what processing the block of data has already undergone, where the block of data processed thus far is stored, and what processing needs yet to be carried out before the block of data can be outputted via the bi-directional bus.

The drawings and their description hereinbefore illustrate rather than limit the invention. It will be evident that there are numerous alternatives which fall within the scope of the appended claims. In this respect, the following closing remarks are made.

There are numerous ways of physically spreading functions or functional elements over various units. In this respect, the drawings are very diagrammatic, each representing only one possible embodiment of the invention. Thus, although a drawing shows different functional elements as different blocks, this no by means excludes that some functional elements, or all functional elements, may be implemented as a single physical unit.

Any reference sign in a claim should not be construed as limiting the claim.

What is claimed is:

1. A method of controlling a data processing arrangement comprising various data processors and a memory arrangement for applying input data to the data processors and for storing output data from the data processors, wherein the following steps are alternately carried out by a global controller:

configuring the data processing arrangement so that different respective data processors process different blocks of data contained in the memory arrangement; and initiating the processing of the blocks of data such that a data processor stops processing when it has completed processing its respective block of data.

2. The method as claimed in claim 1, wherein a subsequent configuration step is carried out only when each data processor has processed its block of data.

3. The method as claimed in claim 1, wherein the processing includes the sub-steps of:
   a) providing an end-of processing indication when a data processor has processed a block of data; and
   b) monitoring whether the different respective data processors have all provided an end-of-processing indication and, if so, proceeding to a new configuration step.

4. The method as claimed in claim 1, wherein the processing comprises a sub-step of writing configuration data into a front register associated with a controllable circuit.

5. The method as claimed in claim 4 wherein the configuring comprises a sub-step of transferring configuration data from the front register to a shadow register, a content of the shadow register defining the operation of the controllable circuit.

6. A data processing arrangement comprising various data processors and a memory arrangement for applying input data to the data processors and for storing output data from the data processors, wherein the data processing arrangement comprises a global controller for alternately carrying out the following steps:
   configuring the data processing arrangement so that different respective data processors process different blocks of data contained in the memory arrangement; and
   initiating the processing of the blocks of data such that a data processor stops processing when it has completed processing its respective block of data.

7. The arrangement as claimed in claim 6, wherein a subsequent configuration step is carried out only when each data processor has processed its block of data.

8. The arrangement as claimed in claim 6, wherein the processing includes the sub-steps of:
   a) providing an end-of processing indication when a data processor has processed a block of data; and
   b) monitoring whether the different respective data processors have all provided an end-of-processing indication and, if so, proceeding to a new configuration step.

9. A computer program product, for controlling a data processing arrangement which comprises various data processors, a global controller, and a memory arrangement for applying input data to the data processors and for storing output data from the data processors, wherein the computer program product comprises a set of instructions which, when loaded into the data processing arrangement, causes the global controller to alternately carry out the steps of:
   a) configuring the data processing arrangement so that different respective data processors process different blocks of data contained in the memory arrangement; and
   b) initiating the processing of the blocks of data such that a data processor stops processing when it has completed processing its respective block of data.

10. The arrangement as claimed in claim 6 wherein the global controller is directly connected to each data processor for signaling a beginning and an end of the processing.

* * * * *